(12) United States Patent
Xie et al.

(10) Patent No.: US 8,786,694 B2
(45) Date of Patent: Jul. 22, 2014

(54) METHOD AND APPARATUS FOR FAST FOCUS IMAGING BIOLOGIC SPECIMENS

(75) Inventors: Min Xie, Plainsboro, NJ (US); Yang Zhang, Bordentown, NJ (US)

(73) Assignee: Abbott Point of Care, Inc., Princeton, NJ (US)

( * ) Notice: Subject to any disclaimer, the term of this patent is extended or adjusted under 35 U.S.C. 154(b) by 489 days.

(21) Appl. No.: 12/982,489

(22) Filed: Dec. 30, 2010

(65) Prior Publication Data

US 2011/0157344 A1 Jun. 30, 2011

Related U.S. Application Data

(60) Provisional application No. 61/291,416, filed on Dec. 31, 2009.

(51) Int. Cl.
*H04N 7/18* (2006.01)

(52) U.S. Cl.
USPC ............................................................ 348/79

(58) Field of Classification Search
USPC ............................................................ 348/79
See application file for complete search history.

(56) References Cited

U.S. PATENT DOCUMENTS

| 6,444,967 | B1 * | 9/2002 | Kosuge et al. ............. 250/201.3 |
| 7,850,916 | B2 | 12/2010 | Wardlaw |
| 2003/0197925 | A1 | 10/2003 | Hamborg |
| 2008/0187466 | A1 | 8/2008 | Wardlaw |
| 2009/0237665 | A1 * | 9/2009 | Wardlaw et al. ............. 356/432 |

FOREIGN PATENT DOCUMENTS

WO 0157785 8/2001

* cited by examiner

*Primary Examiner* — Christopher S Kelley
*Assistant Examiner* — Jonathan Messmore
(74) *Attorney, Agent, or Firm* — O'Shea Getz P.C.

(57) ABSTRACT

A method and apparatus for imaging a biologic fluid sample quiescently residing within a chamber is provided. The method includes the steps of: a) positioning the chamber at a Z-axis position relative to an objective lens having a lens axis, wherein the Z-axis is parallel to the lens axis; b) moving one or both of the chamber and the objective lens relative to one another at a velocity along the Z-axis; and c) creating one or more images of the biologic fluid sample as one or both of the chamber and the objective lens are moving at a velocity relative to one another within a focus search range along the Z-axis.

4 Claims, 7 Drawing Sheets

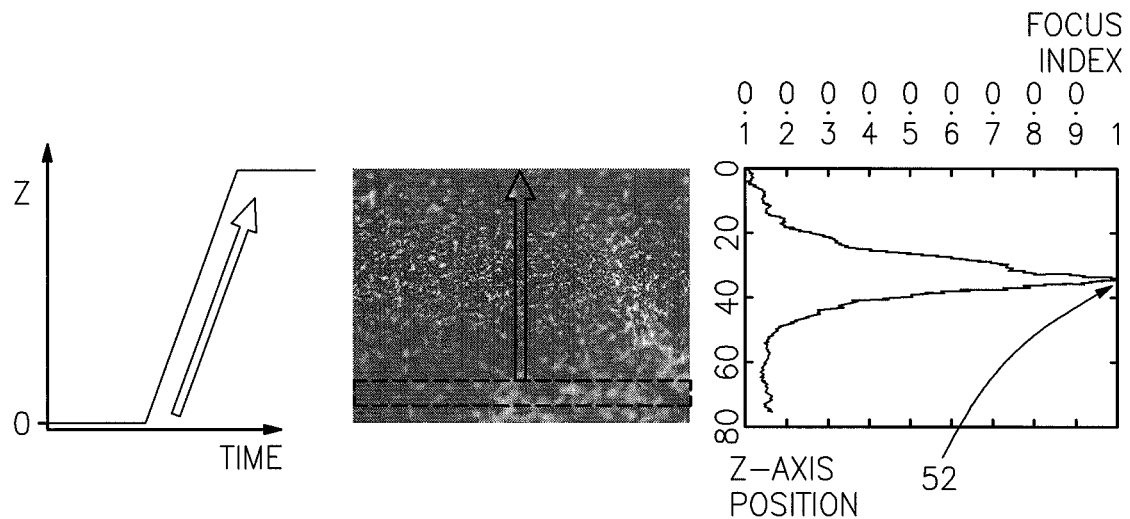
*FIG. 9A*   *FIG. 9B*   *FIG. 9C*
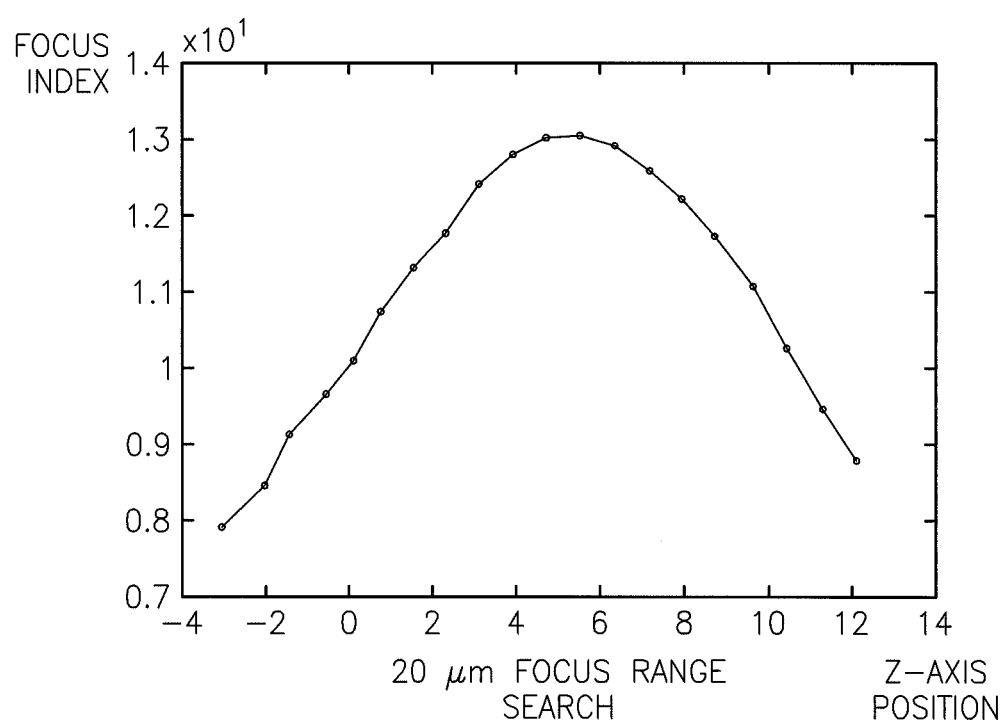
*FIG. 11*

METHOD AND APPARATUS FOR FAST FOCUS IMAGING BIOLOGIC SPECIMENS

Applicant hereby claims priority benefits under 35 U.S.C. §119(e) of U.S. Provisional Patent Application No. 61/291,416 filed Dec. 31, 2009, the disclosure of which is herein incorporated by reference.

BACKGROUND OF THE INVENTION

1. Technical Field

The present invention relates to methods and apparatus for imaging biologic specimens in general, and to methods and apparatus for fast focus imaging biologic specimens for analysis in particular.

2. Background Information

Historically, biologic fluid samples such as whole blood, urine, cerebrospinal fluid, body cavity fluids, etc. have had their particulate or cellular contents evaluated by smearing a small undiluted amount of the fluid on a slide and evaluating that smear under a manually operated microscope. Different areas of the smear were examined by manipulating the slide in an X-Y plane. Focus was accomplished by altering the position of the slide along the Z-axis relative to the microscope objective. Reasonable results were attainable using these techniques, but they relied heavily upon the technician's experience and technique. Manually examining the various fields of the sample is also labor intensive and therefore not practically feasible for commercial laboratory applications.

Automated apparatus for analyzing biologic fluid samples are known, including some that are adapted to image a sample of biologic fluid quiescently residing within a chamber. To accurately perform an analysis of a sample quiescently residing with a chamber it is necessary to focus the optics of the device at various different heights (e.g., different heights along a Z-axis for a sample chamber disposed within an X-Y axis plane. To efficiently perform such an analysis, it is necessary to provide such focus at different heights in an accurate, rapid manner.

SUMMARY OF THE DISCLOSURE

According to an aspect of the present invention, a method for imaging a biologic fluid sample quiescently residing within a chamber is provided. The method includes the steps of: a) positioning the chamber at a Z-axis position relative to an objective lens having a lens axis, wherein the Z-axis is parallel to the lens axis; b) moving one or both of the chamber and the objective lens relative to one another at a velocity along the Z-axis; and c) creating one or more images of the biologic fluid sample as one or both of the chamber and the objective lens are moving at a velocity relative to one another within a focus search range along the Z-axis.

According to another aspect of the present invention, an apparatus for imaging a biologic fluid sample quiescently residing within a chamber is provided. The apparatus includes a field illuminator, a positioner, an image dissector, and a programmable analyzer. The field illuminator has an objective lens with a lens axis. The positioner is adapted to position one or both of the objective lens and the chamber relative to the other. The image dissector is adapted to image sample within the chamber. The programmable analyzer is adapted to control the positioner to move one or both of the objective lens and the chamber relative to the other along a Z-axis of movement parallel to the lens axis at a velocity. The analyzer is further adapted to create one or more images of the biologic fluid sample as one or both of the chamber and the objective lens are moving at a velocity relative to one another within a focus search range along the Z-axis.

The features and advantages of the present invention will become apparent in light of the detailed description of the invention provided below, and as illustrated in the accompanying drawings.

BRIEF DESCRIPTION OF THE DRAWINGS

FIG. 3 illustrates a fluid module of the cartridge in a closed condition, and FIG. 4 illustrates the fluid module in an open position.

FIG. 6 illustrates an embodiment wherein the separator can compress to allow for a uniform height chamber, and FIG. 7 illustrates an embodiment wherein the first panel can deform to create a uniform height chamber.

FIGS. 9A-9C diagrammatically illustrate changes in focus with a rolling shutter in continuous acquisition mode. FIG. 9A illustrates the chamber velocity accelerating from zero to a constant velocity, where it is maintained during a focus search. FIG. 9B illustrates the focus of the image as a function of Z-axis position. FIG. 9C is a plot having a horizontal axis of focus index versus a vertical axis of relative Z-axis position.

FIGS. 11-13 are plots of focus index versus a Z-axis position for focus search ranges of 20 μm, 40 μm, and 80 μm, respectively.

DETAILED DESCRIPTION OF THE INVENTION

Figure 1:
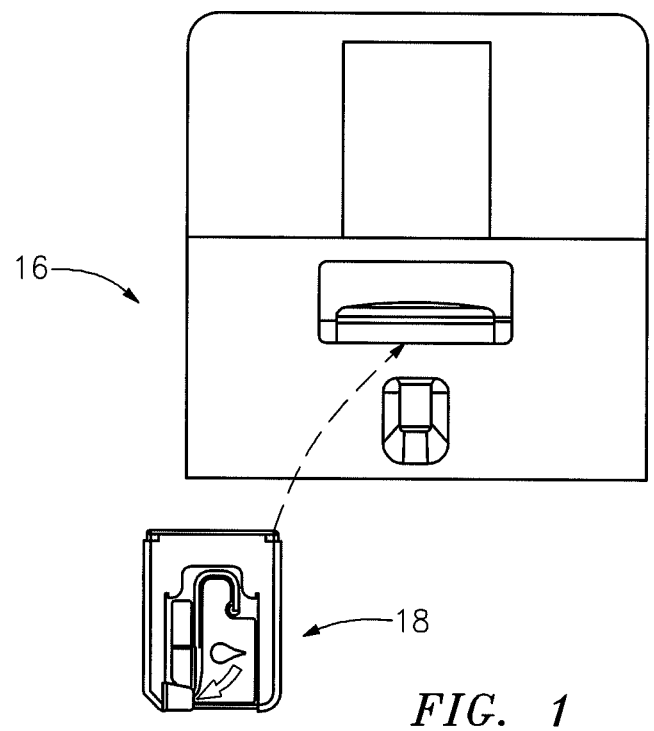
FIG. 1 is a diagrammatic illustration of a biologic fluid analysis apparatus.
Figure 2:
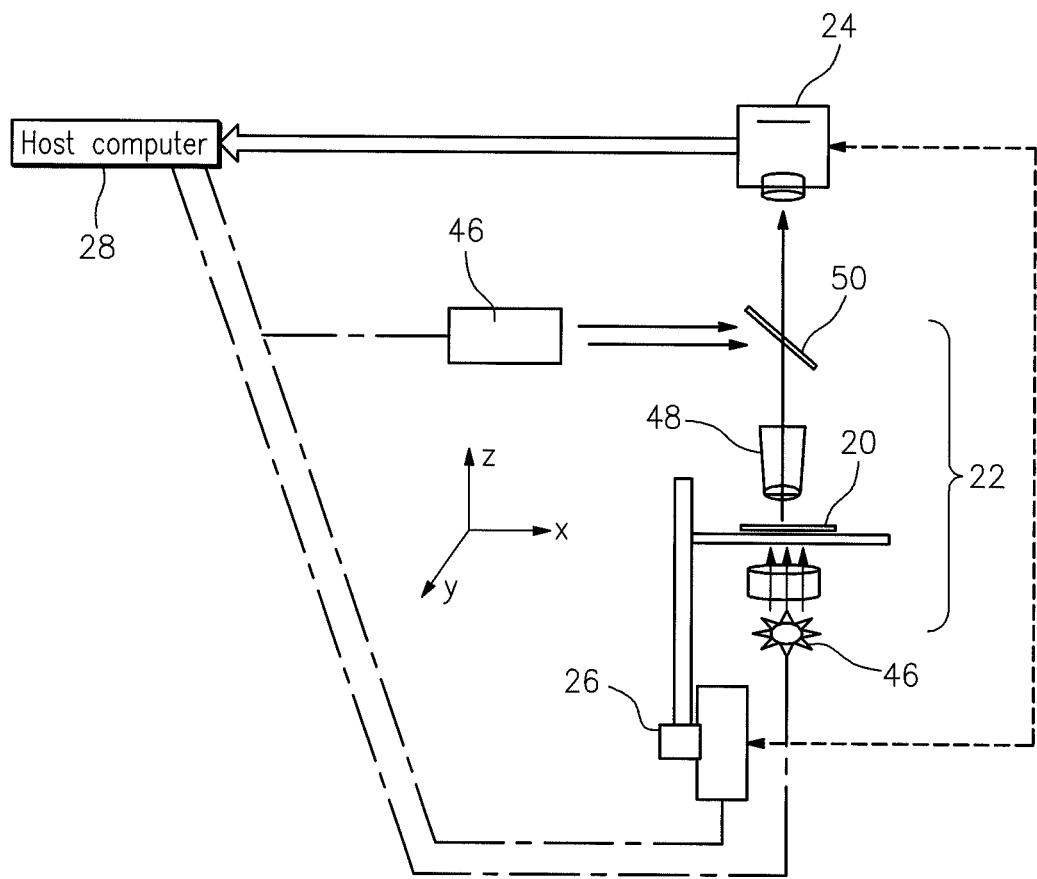
FIG. 2 is a schematic representation of components within the analysis apparatus.

Referring to FIGS. 1-2, the analysis apparatus 16 is adapted to receive a sample analysis cartridge 18 having an analysis chamber 20 configured to contain a biologic sample (e.g., blood) from a subject for analysis. The apparatus 16 includes a field illuminator 22, an image dissector 24, a positioner 26, and a programmable analyzer 28. For purposes of this description, the terms "analyze" and "analysis" shall be defined as any examination or evaluation of the fluid sample, including but not limited to, the examination of constituents within the biologic fluid sample.

The analysis apparatus 16 can be used with a variety of different sample analysis chambers 20, including those described in co-pending U.S. patent application Ser. Nos. 12/971,860; 12/061,394; and U.S. Pat. No. 7,850,916, each of which are incorporated herein by reference in its entirety. For purposes of this disclosure, the invention will be described as using the analysis chamber and cartridge described in U.S. patent application Ser. No. 12/971,860. The present invention is not limited, however, to use with the aforesaid chamber 20 and cartridge 18.

Figure 3:
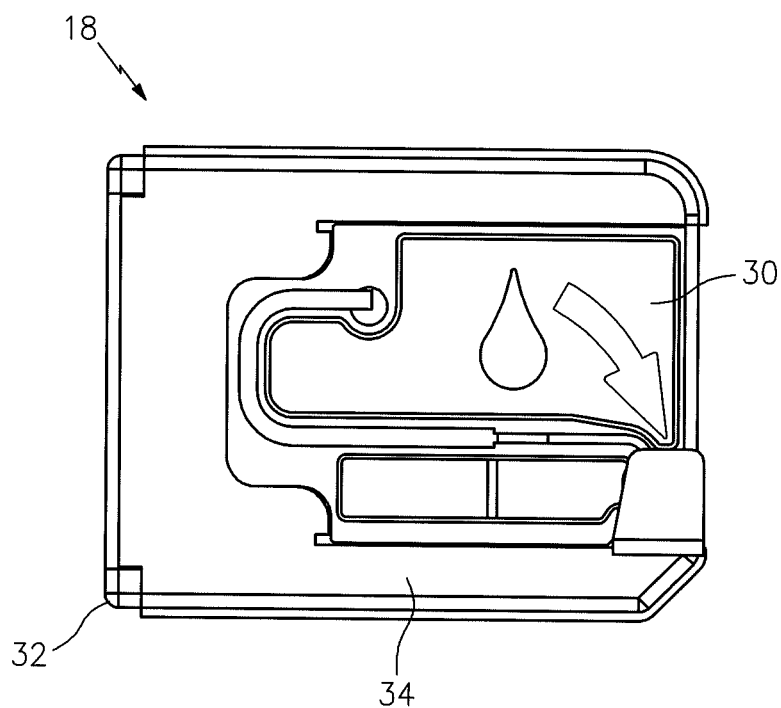
FIGS. 3 and 4 illustrate an embodiment of a biologic sample analysis cartridge.
Figure 4:
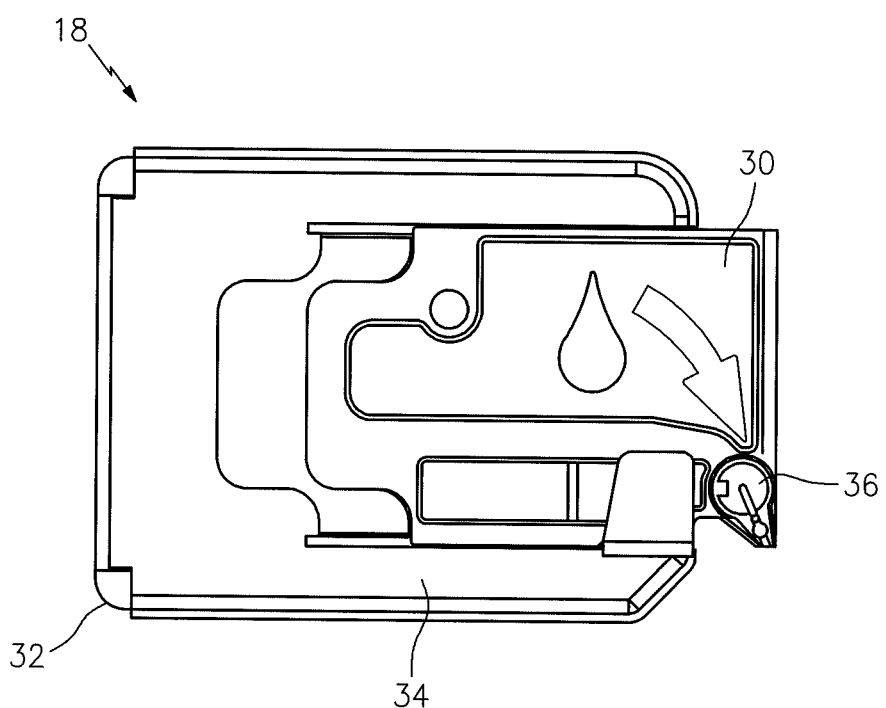

Referring to FIGS. 3-4, the sample analysis cartridge 18 includes a fluid module 30, an image tray 32, and a housing 34. The fluid module 30 includes a sample port 36 configured to receive a fluid sample from either a syringe or a subject collection site; e.g., from a finger or heel stick. The fluid sample is subsequently drawn into the cartridge 18 where it can be selectively transferred to an analysis chamber 20 (see FIGS. 5-7) located within the image tray 32.

Figure 5:
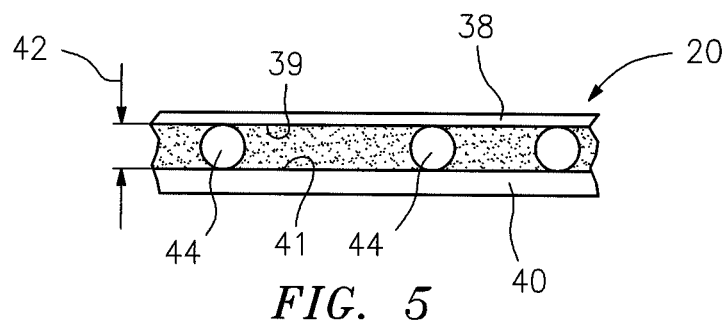
FIGS. 5-7 diagrammatically illustrate an analysis chamber.
Figure 6:
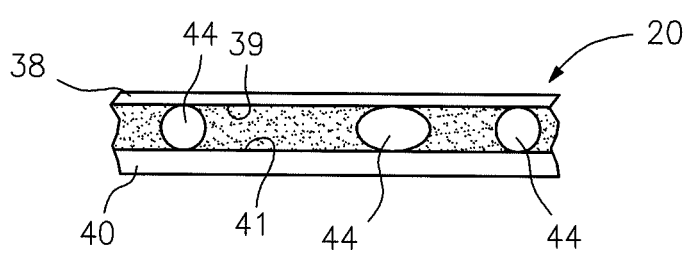
Figure 7:
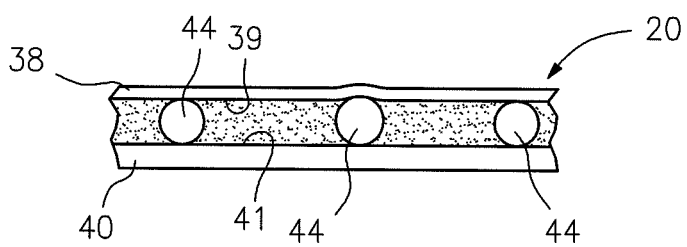

Referring to FIGS. 5-7, the analysis chamber 20 includes a first panel 38 and a second panel 40, at least one of which is sufficiently transparent to permit a biologic fluid sample disposed between the panels 38, 40 to be imaged for analysis purposes. The first and second panels 38, 40 are typically substantially parallel one another, are substantially aligned with one another, and are separated from each other by a distance extending between the opposing surfaces 39, 41 of the two panels 38, 40. The alignment between the panels 38, 40 defines an area wherein light can be transmitted perpendicular to one panel 38, and it will pass through that panel, the sample, and the other panel 40 as well, if the other panel is also transparent. The separation distance between the panel surfaces (also referred to as the "height" 42 of the chamber 20) is sized such that a biologic fluid sample disposed between the two surfaces 39, 41 will be in contact with both surfaces.

In some embodiments, the first and second panels 38, 40 are separated from one another by at least three separators 44 (typically spherical beads). In preferred embodiments, at least one of the panels 38, 40 or the separators 44 is sufficiently flexible to permit the chamber height 42 to approximate the mean height of the separators 44. The relative flexibility provides the chamber 20 with a substantially uniform height despite minor dimensional tolerance variances in the separators 44.

The chamber 20 is typically sized to hold about 0.2 to 1.0 μl of sample, but the chamber 20 is not limited to any particular volume capacity, and the capacity can vary to suit the analysis application. The chamber 20 is operable to quiescently hold a liquid sample. The term "quiescent" is used to describe that the sample is deposited within the chamber 20 for analysis, and is not purposefully moved during the analysis. To the extent that motion is present within the blood sample, it will predominantly be due to Brownian motion of formed constituents within the blood sample, which motion is not disabling of the use of this invention.

Now referring back to FIG. 2, the field illuminator 22 includes a light source 46 and objective optics (e.g., objective lens 48, filters 50, etc.). The light source 46 produces light throughout a wavelength range broad enough to be useful for a plurality of analyses (e.g., approximately 340 nm to 670 nm). The light source 46 can produce light from a single source or from a plurality sources that collectively produce the light along the desired wavelengths; e.g., a zenon arc lamp, a tungsten halogen lamp, LEDs, or a pulsatile source.

The path of the light emanating from the light source 46 will depend upon the whether the sample is being analyzed using fluorescence or transmittance. When fluorescence is used an objective lens 48 focuses light emanating from the light source 46 into a light beam which, in turn, is directed into the sample quiescently residing within the chamber 20. The light beam illuminates at least one field of the sample, which field is defined by the cross-sectional area of the sample image which impinges on the image dissector 24, or a portion thereof. The light causes material within the sample (e.g., fluorescent dye) to fluoresce and emit light of a particular wavelength. The emitted light passes back through the objective lens 48 and is subsequently captured by an image dissector 24. When transmittance is used, the field illuminator 22 is configured to direct light through the chamber first panel 38 and second panel 40 (which are both sufficiently transparent to allow the light to pass there through), and the fluid sample residing there between. The transmitted light passes through the objective lens 48 and is subsequently captured by an image dissector 24.

The positioner 26 is adapted to change the relative positions of the objective lens 48 and the analysis chamber 20. A change in the relative positions of the objective lens 48 and the analysis chamber 20 can be accomplished in a variety of different ways; e.g., move one of the objective lens 48 and analysis chamber 20 relative to the other along all relevant axes (e.g., X, Y, and Z), or move the chamber 20 along particular axes (e.g., the X and Y axes) and the lens along the other axis (e.g., the Z-axis), etc. For ease of description, the positioner 26 is described herein as being adapted to move the cartridge 18 and incorporated analysis chamber 20 along multiple axes of motion (e.g., X, Y, and Z) relative to a stationary objective lens 48. The present invention is not limited to this embodiment, however. The chamber 20 is movable in the X-Y plane to permit the objective lens 48 to capture all fields of the sample residing within the chamber 20, and movable along the Z-axis to change the focal position relative to the sample height. Motion of the chamber 20 relative to the objective lens 48 can be accomplished by a variety of different devices, including but not limited to, a controllable stepper motor that can be operated to selectively produce either continuous motion of the chamber 20 relative to the objective lens 48 or incremental movement of the chamber 20 relative to the objective lens 48.

An acceptable image dissector 24 is a complementary metal-oxide semi-conductor (CMOS) type digital image dissector 24, preferably one that can provide at least eight (8), and most preferably twelve (12), bits of resolution per pixel. The image dissector 24 converts an image of the light into an electronic data format that can be seen and/or interpreted in real-time or at a subsequent time. Alternatively, an image dissector 24 other than a CMOS may be used to convert the image of light into an electronic data format.

In preferred embodiments, the image dissector 24 is a CMOS camera that can be operated in an electronic rolling shutter (ERS) snapshot mode or in an electronic rolling shutter (ERS) continuous mode. In the snapshot mode, the camera is adapted to capture an image of a field at a discrete moment in time. In the rolling shutter continuous mode, the camera is adapted to capture an image of a field over a particular period of time. An example of an acceptable image dissector 24 is a Model MT9P031 imager produced by the Aptina Imaging Corporation of San Jose, Calif., U.S.A. The present invention is not limited, however, to this image dissector 24.

The programmable analyzer 28 includes a central processing unit (CPU) that is adapted (e.g., programmed) to selectively perform the functions necessary to perform the present method. It should be noted that the functionality of the programmable analyzer 28 may be implemented using hardware, software, firmware, or a combination thereof. A person skilled in the art would be able to program the processing unit to perform the functionality described herein without undue experimentation. The programmable analyzer 28 is in communication with and is programmed to coordinate the operation of the field illuminator 22, the image dissector 24, and the positioner 26 to image the fluid sample quiescently residing within the chamber 20. In most instances, the analysis apparatus 16 is operated to image the entire sample within the chamber 20, which process involves imaging multiple fields (e.g., 50-100) of the sample. The chamber 20 may be described in terms of orthogonal rows and columns, where each analysis field resides at a particular row and column coordinate. All the field images can be combined to create an image of the entire sample.

With respect to each sample field, the programmable analyzer 28 is programmed to coordinate the operation of the field illuminator 22, the image dissector 24, and the positioner 26 to operate in an auto-focusing mode that permits the apparatus 16 to account for very fine differences in the position of the focal plane along the Z-axis for a given field. In the auto-focusing mode, the relative positions of the analysis chamber 20 and the objective lens 48 are varied along the Z-axis to determine and capture an image with an acceptable sharpness (i.e., contrast). The positioner 26 preferably moves the chamber 20 relative to the objective lens 48 at a constant velocity along the Z-axis. During the movement of the chamber 20, the field illuminator 22 and the image dissector 24 are operated in concert to capture images. The constant velocity movement utilized within embodiments of the present invention avoids problems associated with a "move-stop-acquire-move" mode of operation; e.g., relatively slow operation due to the time required to stop, settle, and subsequently move the chamber 20, and the expense associated with the hardware necessary to move and settle the chamber 20 quickly and accurately in increments of a micron or submicron.

Figure 8:
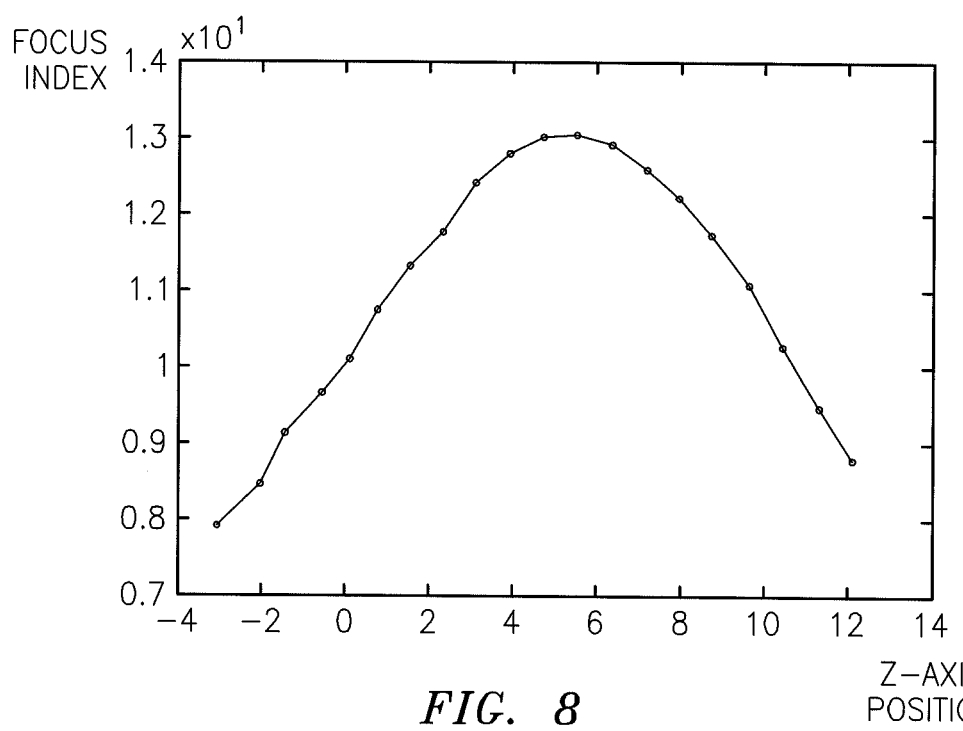
FIG. 8 is a plot having a vertical axis of focus index versus a horizontal axis of relative Z-axis position between a sample chamber and an objective lens.

In one auto-focusing mode, the movement and imaging of the chamber 20 are coordinated so that discrete images are incrementally captured as the chamber 20 changes Z-position relative to the objective lens 48. The plot shown in FIG. 8 illustrates focus index versus Z-axis position of the chamber 20 relative to the objective lens 48 for a focus search range of 20 µm, with a resolution of 1 µm that provides twenty data points. In one embodiment of this mode, the image dissector 24 is signaled to capture images by the positioner 26 (i.e., in an external trigger mode). The positioner 26 sends a "trigger" signal (e.g., a TTL signal) to the image dissector 24 each time the chamber 20 moves a predetermined distance (i.e., ΔZ) along the Z-axis. In this example, the positions at which images are acquired can be described as:

$$Z_i = Z_{start} + i \cdot \Delta Z$$

where the variable "i" is the image index. Because the initial position of the chamber 20 ($Z_i$) is known and the ΔZ is chosen for the application at hand, each incremental position is also known. In another embodiment of this mode, the image dissector 24 can be periodically operated by a timing mechanism (e.g., control software) that is independent of, but coordinated with the Z-axis movement of the chamber 20; e.g., images are captured every Δt, and the chamber 20 is moved at a velocity of ΔZ/Δt. Alternatively, the image dissector 24 can send signals (e.g., "strobe" signals) to the positioner 26 to have the position recorded at the point the image is taken.

In both embodiments, the incremental rate at which images are captured is chosen in view of the resolution of the image and the time it takes the image dissector 24 to create the image (i.e., the "frame time"). For example, the "Z-velocity" (i.e., distance/time) must be less than or equal to the distance traveled between Z-axis points at which the image is captured (i.e., the "focus resolution"), divided by the amount of "frame time":

$$Z\_Velocity \leq \frac{focus\_resolution}{frame\_time}$$

The frame time is selected based on the capability of the image dissector 24. The application at hand will dictate an acceptable focus resolution. For example, an acceptable focus resolution for an image analysis of a whole blood sample disposed within an analysis chamber 20 having a depth of field of about 2.7 µm is between about 1.0 to 4.0 µm. Once a focus resolution is selected, the number of images for a given focus range can then be determined as follows:

$$Number\_of\_images = \frac{focus\_range}{focus\_resolution}$$

Once the number of images is determined, then the total focus search time can be determined by multiplying the number of images by the frame time per image. To increase the throughput of the analysis apparatus 16, the image dissector 24 can be set to the fastest speed possible without degrading the image resolution to distinguish the detail contrast. As stated above, an Aptina model MT9P031 imager is example of an acceptable image dissector 24 operable in a snapshot acquisition mode. An Aptina model MT9P031 imager operating in snapshot mode may, as an example, be adjusted to the following settings, which takes about 10-14 msec per frame: a) central quarter range of interest (ROI); b) binned 2; and c) 1 msec exposure time.

In the above-described auto-focusing mode, the movement of the analysis chamber 20 relative to the objective lens 48 between the discrete positions at which images are taken does not have to be a constant velocity, but a constant velocity is preferred. As indicated above, there are problems associated with a "move-stop-acquire-move" imaging mode of operation. Movement of the analysis chamber 20 relative to the objective lens 48 at a constant velocity, or a substantially constant velocity, reduces or eliminates these problems.

In another auto-focusing mode, the analysis chamber 20 is continuously imaged as the chamber 20 moves at a constant velocity along the Z-axis relative to the objective lens 48 for the entire focus search range. Initially, the chamber 20 is typically moved to the beginning of the search region (i.e., a particular field of the sample) and the chamber 20 is accelerated from a zero Z-axis velocity until it reaches the predetermined Z-axis velocity. The chamber 20 is thereafter constantly moved relative to the lens 48 at the predetermined Z-axis velocity. FIG. 9A illustrates the Z-velocity acceleration of the chamber 20 relative to the lens 48, and subsequently movement at constant velocity. Once the constant velocity along the Z-axis has been reached, the camera rolling shutter starts and the continuous imaging of the sample field begins. The rolling shutter image dissector 24 images the sample within the field, starting at the bottom of the sample field (e.g., the lowest chamber Z-position) and moving to the top of the sample field (e.g., the highest chamber Z-position). FIG. 9B illustrates the image of the sample, from the bottom of the sample field to the top of the sample field. If the focal plane is disposed within the search region (i.e., between the bottom and the top of the sample within the field), the contrast of the acquired image changes from blurred to sharp then to blurred again from bottom to top of the image field, while the chamber 20 moves along the Z-axis. The contrast value can then be plotted against Z position of the focal plane. FIG. 9C is a plot of the focus index (e.g., image sharpness) as a function of the Z-axis position, which clearly illustrates a "best" focal plane position 52. The Z-axis velocity of the chamber 20 relative to the objective lens 48 in this continuous mode is preferably such that the chamber 20 moves through the focus range in the amount of time it takes the image dissector 24 to capture an image. As stated above, an Aptina model MT9P031 imager is example of an acceptable image dissector 24 operable in a continuous acquisition mode. The recommended settings for an Aptina model MT9P031 imager operating in rolling shutter continuous mode are: a) full resolution; b) no bin; and c) 1 msec exposure time which provides a rolling shutter width equal to twenty-seven (27) rows. At these settings, the Aptina Model MT9P031 can be operated with a frame time of approximately 71.66 msec. If the sample search range is 80 μm, the Z-axis velocity of the chamber 20 relative to the objective lens 48 is 80 μm/71.66 msec=1.12 μm/msec.

Figure 10:
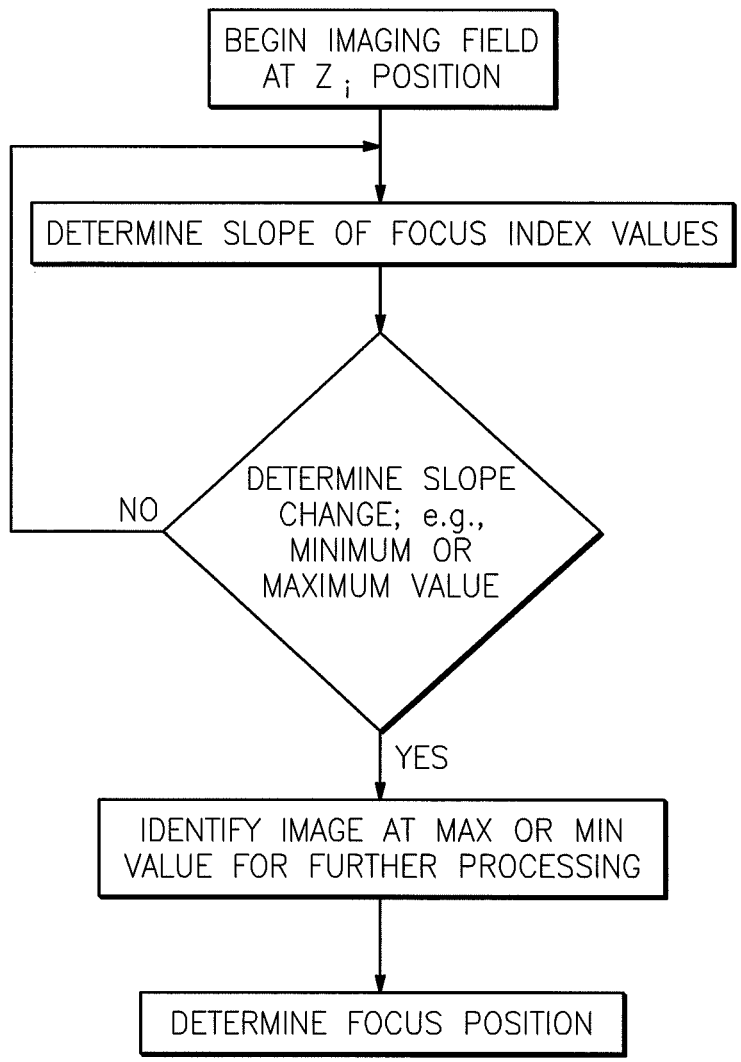
FIG. 10 is flow chart for a Smart Focus procedure.

In some embodiments, the programmable analyzer 28 is programmed with a "SmartFocus" procedure that is adapted to determine an acceptable Z-axis focal position in a reduced amount of time. Under the methods described above, the Z-axis sample search range is imaged according to a particular defined resolution; e.g., a 100 μm sample search range, with a resolution of 5 μm, requires twenty images be taken and the time associated with creating twenty such images. The SmartFocus procedure, in contrast, evaluates the resolution of each image relative to previous images to determine if an optimum resolution has been reached (see FIG. 10). As indicated above, if the focal plane is within the search range, the image will move from out of focus, into focus, and then back out of focus as the chamber 20 moves along the Z-axis relative to the objective lens 48. A plot of the change in resolution as a function of Z-axis position will appear as a bell curve. The SmartFocus procedure utilizes the bell-shaped relationship by looking for a change in the slope of the curve; e.g., a change in the sign of the derivative of the slope, or a maximum or minimum position of a polynomial equation fit to the data points. Once a change in the derivative of the slope is determined, or a maximum or minimum position in the plot is determined, no further Z-axis images are required. The image captured at the maximum or minimum point will have the optimum sharpness, and can be used for further analysis. Because no further images are required, this technique reduces the amount of time required to capture the image with a desired sharpness.

Figure 12:
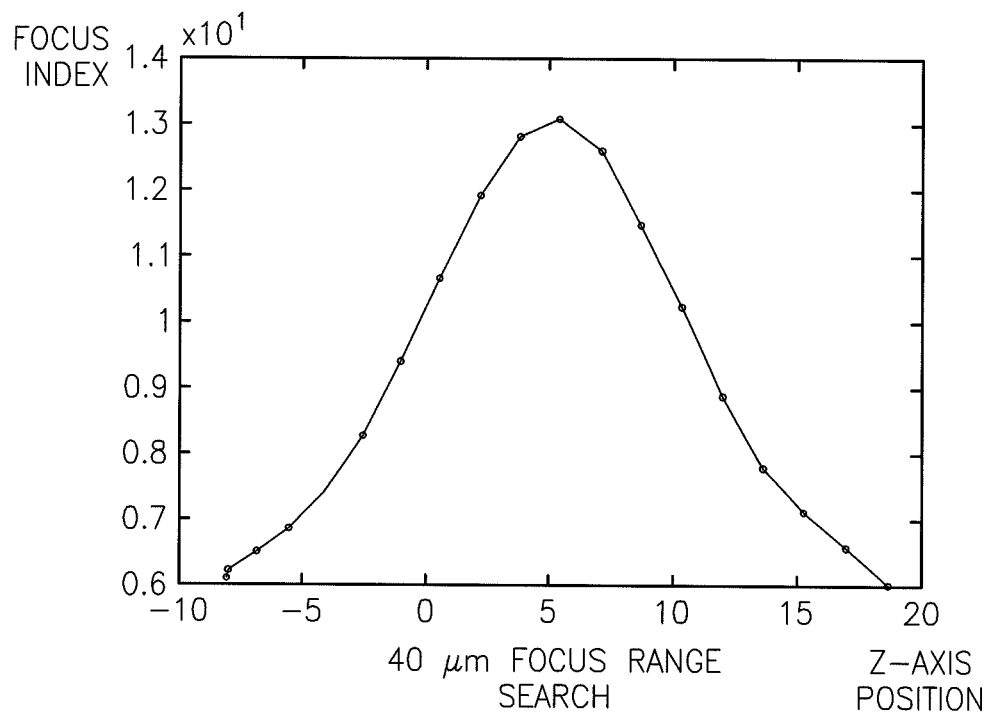
Figure 13:
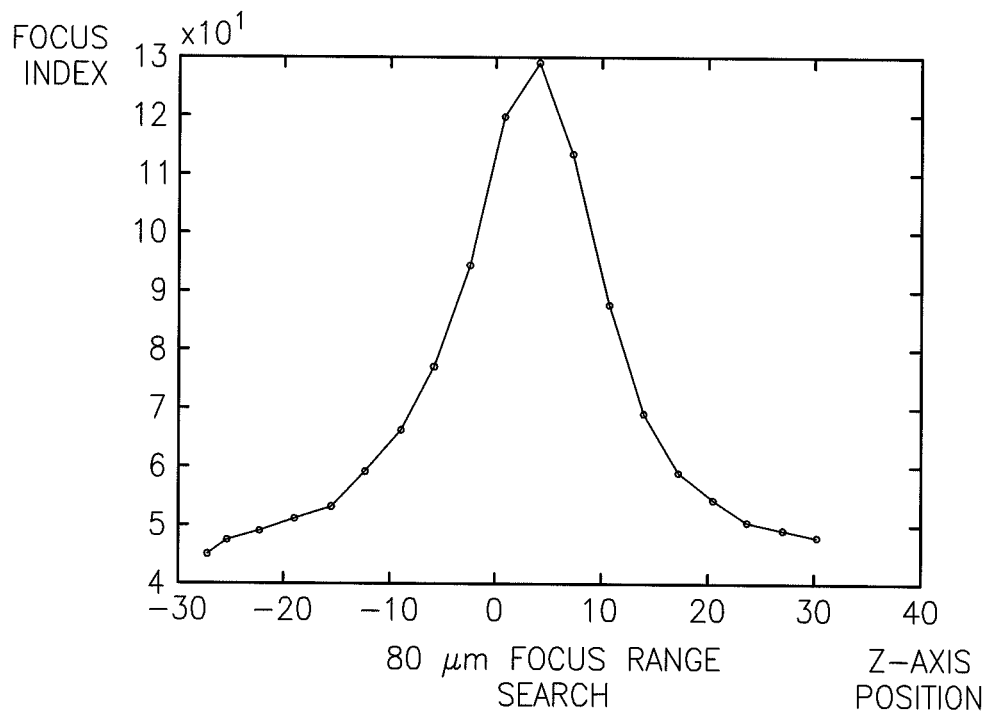

If a polynomial equation is fit to the analysis data, the time required to determine the Z-axis focal position can be reduced still further by decreasing the resolution of the imaging (e.g., imaging every 4 μm instead of every 1 μm) without a detrimental decrease in accuracy. Twenty images of test data were taken at focus search ranges of 20 μm, 40 μm, and 80 μm (yielding resolutions of 1 μm, 2 μm, and 4 μm, as shown in FIGS. 11-13 respectively) and image sharpness data was collected at the respective resolution values. A polynomial equation was also fit to the focus data for each search range. The image sharpness values versus Z-axis position and the polynomial equation based on those values were plotted for each focus search range. The plotted results of the different focus range searches indicated that the image sharpness data closely correlated with data determinable from a polynomial equation fit to the data. In fact, the correlation was such that the focal position determinable from the polynomial fit was within acceptable error tolerance.

Figure 14:
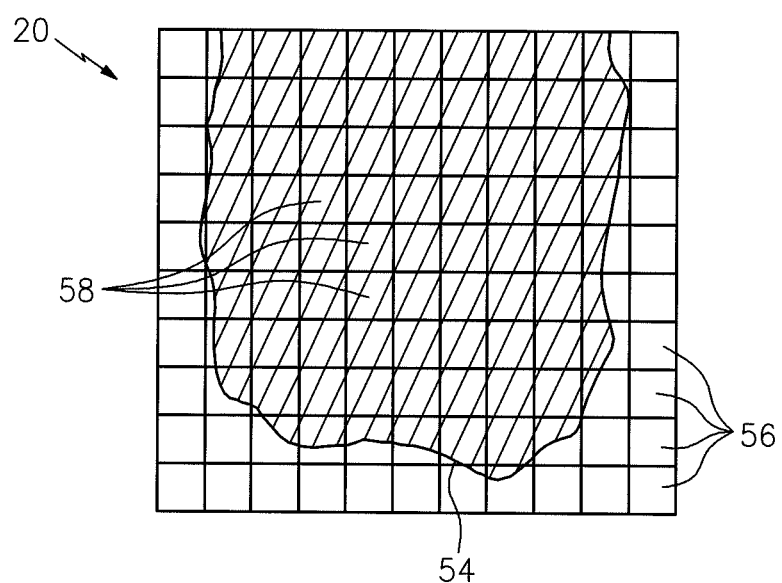
FIG. 14 is a diagrammatic illustration of an analysis chamber with an orthogonal grid superimposed to illustrate sample fields within the chamber.

The present invention is described above in modes of operation wherein the positioner 26 moves the chamber 20 relative to the objective lens 48 at a constant velocity along the Z-axis. In particular, the present invention is described above as being adapted to operate in a first auto-focusing mode wherein discrete images of a sample field are periodically captured at different positions along the Z-axis, and in a second auto-focusing mode wherein a sample field is continuously imaged over a period of time as the chamber 20 moves at a constant velocity. These auto-focusing modes of operation may be used independent of one another, or in combination with one another. For example, sample fields that are statistically less likely to contain relevant analysis data can be analyzed using the discrete snapshot imaging mode, and those sample fields that are statistically more likely to contain relevant analysis data can be analyzed using the continuous imaging mode. Referring to FIG. 14, an analysis chamber 20 is diagrammatically illustrated, with an orthogonal grid superimposed thereon. A sample 54 is depicted quiescently residing within the chamber 20. Sample fields 56 around the periphery of the chamber are shown as empty, devoid of sample. In some applications, it may be statistically more likely that these peripheral fields 56 are devoid of sample (or otherwise devoid of relevant analysis data), as compared with central sample fields 58 that are statistically more likely to contain sample 54. In a mode of operation where both auto-focusing modes are utilized, the peripheral sample fields 56 (i.e., those statistically less likely to contain relevant analysis data) are analyzed using the discrete snapshot imaging mode, and the central sample fields 58 (i.e., those statistically more likely to contain relevant analysis data) are analyzed using the continuous imaging mode. Depending upon the particular application, the operation of the present invention using both auto-focusing modes can yield a more efficient and quicker processing of the sample, while maintaining desirable accuracy.

The present method provides several advantages. For example, the present method allows faster analysis of a fluid sample because the analysis chamber 20 can be positioned and imaged, and that image processed, in a substantially parallel (rather than serial) process. Another advantage of the present invention is that it utilizes a continuous Z-axis movement of the chamber 20 relative to the objective lens 48. The continuous Z-axis movement eliminates the need to provide a positioner 26 adapted to stop and start motion of the chamber 20 relative to the objective lens 48 during imaging, and one adapted to settle the chamber 20 upon being stopped. The present invention also eliminates the time associated with iteratively accelerating the chamber 20 to a constant velocity, decelerating the chamber 20 from a constant velocity to a rest position, and settling the chamber 20 relative to the objective lens 48 once the chamber 20 is "stopped". As a result, the analysis can be performed in less time, using a device that is typically less expensive than one required to operate in a start and stop mode. Another advantage of the present invention is that it is possible to improve repeatability of results and thus the overall precision of the analysis since more images are acquired in a closer interval.

The present invention also makes it possible to utilize a wider focus search range without increasing focus time by reducing the resolution.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A method for imaging a biologic fluid sample quiescently residing within a chamber, comprising the steps of:

positioning the chamber at a Z-axis position relative to an objective lens having a lens axis, wherein the Z-axis is parallel to the lens axis;

moving one or both of the chamber and the objective lens relative to one another at a velocity along the Z-axis; and periodically creating one or more images of the biologic fluid sample as one or both of the chamber and the objective lens are moving at a velocity relative to one another within a focus search range along the Z-axis, wherein each image is associated with a known Z-axis position within the focus search range, and wherein each image has a quantifiable focus index, and the quantifiable focus index is contrast;

wherein one or both of the chamber and the objective lens move relative to one another at a constant velocity along the Z-axis at the time the images are created;

comparing the focus index of the images to determine a relative amount of focus index in each of the images;

fitting a polynomial equation to the relative amount of focus index in each image versus the Z-axis position of the respective images for the images taken within the focus search range;

identifying a change in sign of the slope of the polynomial equation; and analyzing the sample using the image taken at the Z-axis position associated with the change in slope.

2. A method for imaging a biologic fluid sample quiescently residing within a chamber, comprising the steps of:

positioning the chamber at a Z-axis position relative to an objective lens having a lens axis, wherein the Z-axis is parallel to the lens axis;

moving one or both of the chamber and the objective lens relative to one another at a velocity along the Z-axis;

creating an image of the biologic fluid sample as one or both of the chamber and the objective lens are moving at a velocity relative to one another within a focus search range along the Z-axis, wherein the single image is created by continuously imaging the sample within the focus search range, wherein the image includes a plurality of portions, each associated with a Z-axis position within the focus search range, wherein each image portion has a quantifiable focus index, and wherein the quantifiable focus index is contrast;

comparing the focus index of the image portions, which image portions are created as one or both of the chamber and the objective lens are moving at a velocity relative to one another, to determine a relative amount of focus index in each of the image portions; and determining the image portions having greater relative amounts of focus index than other image portions;

fitting a polynomial equation to the relative amount of focus index in each image portion versus the Z-axis position of the respective image portion;

identifying a change in sign of the slope of the polynomial equation; and analyzing the sample using the image portion taken at the Z-axis position associated with the change in slope.

3. A method for imaging a biologic fluid sample quiescently residing within a chamber, comprising the steps of:

positioning the chamber at a Z-axis position relative to an objective lens having a lens axis, wherein the Z-axis is parallel to the lens axis;

moving one or both of the chamber and the objective lens relative to one another at a velocity along the Z-axis; and creating one or more images of the biologic fluid sample as one or both of the chamber and the objective lens are moving at a velocity relative to one another within a focus search range along the Z-axis;

wherein one or both of the chamber and the objective lens move relative to one another at a constant velocity along the Z-axis at the time the images are created; and wherein the constant velocity is less than a distance between positions along the Z-axis adjacent images are created, divided by an amount of time spent creating one of the images.

4. A method for imaging a biologic fluid sample quiescently residing within a chamber, comprising the steps of:

positioning the chamber at a Z-axis position relative to an objective lens having a lens axis, wherein the Z-axis is parallel to the lens axis;

moving one or both of the chamber and the objective lens relative to one another at a velocity along the Z-axis;

creating one or more images of the biologic fluid sample as one or both of the chamber and the objective lens are moving at a velocity relative to one another within a focus search range along the Z-axis;

wherein each image is associated with a known Z-axis position within the focus search range, and wherein each image has a quantifiable focus index;

comparing the focus index of the images, which images are created as one or both of the chamber and the objective lens are moving at a velocity relative to one another, to determine a relative amount of focus index in each of the images;

determining the images having greater relative amounts of focus index than other images;

wherein one or both of the chamber and the objective lens move relative to one another at a constant velocity along the Z-axis at the time the images are created;

wherein the step of creating the images includes periodically creating discrete images of sample within the focus search range disposed in the first portions of the chamber, and continuously imaging sample within the focus search range disposed in one or more second portions of the chamber, to create a single image of the sample;

wherein the discrete images of sample disposed in the first portions of the chamber are each associated with a known Z-axis position and each has a quantifiable focus index; and wherein the continuous image of the sample disposed in the second portion of the chamber has subportions, each associated with a known Z-axis position and each has a quantifiable focus index.

* * * * *